Nov. 14, 1972  J. P. COX  3,702,655

STICK-CLASSIFYING METHOD AND APPARATUS

Filed Jan. 18, 1971  6 Sheets-Sheet 1

INVENTOR
JAMES P. COX
BY
Robert W. Beach
ATTORNEY

Nov. 14, 1972   J. P. COX   3,702,655
STICK-CLASSIFYING METHOD AND APPARATUS
Filed Jan. 18, 1971   6 Sheets-Sheet 5

INVENTOR.
JAMES P. COX
BY
Robert W. Beach
ATTORNEY

Nov. 14, 1972    J. P. COX    3,702,655
STICK-CLASSIFYING METHOD AND APPARATUS
Filed Jan. 18, 1971    6 Sheets-Sheet 6

INVENTOR.
JAMES P. COX
BY
Robert W. Beach
ATTORNEY

United States Patent Office 3,702,655
Patented Nov. 14, 1972

3,702,655
STICK-CLASSIFYING METHOD AND APPARATUS
James P. Cox, 290 N. Howard, Burnaby,
British Columbia, Canada
Continuation-in-part of application Ser. No. 14,159,
Feb. 25, 1970. This application Jan. 18, 1971, Ser.
No. 107,178
Int. Cl. B07c 5/04
U.S. Cl. 209—80         15 Claims

ABSTRACT OF THE DISCLOSURE

Falling of successive sticks which are nonuniform lengthwise is controlled initially by launching each stick by an end in a generally horizontal direction and/or by engagement of the stick during its fall with a barrier causing the stick to swing, so that following the fall the sticks are oriented with the butts and the tips of virtually all of the sticks in corresponding relationship, irrespective of the initial butt and tip orientation of the sticks. An asparagus shoot, for example, is launched generally horizontally endwise such as by cooperating rotative pinching members, such as an upper roller and a lower belt, gripping an end portion. A shoot launched butt first will droop much more than a shoot launched tip first. During its fall a shoot launched tip first may engage a barrier roller nearer its tip to swing its butt down. A discharge conveyor removes the shoots butt first.

---

This application is a continuation-in-part of application Ser. No. 14,159, filed Feb. 25, 1970, for Stick-Orienting Method and Apparatus.

A principal object of the invention is to orient sticks which are nonuniform lengthwise automatically so that the tips of the sticks will all point in one direction and the butts will all point in the opposite direction. By such an automatic operation such orientation is facilitated and hand labor is saved.

A further object is to provide a method and apparatus for orienting sticks which are nonuniform lengthwise, not only automatically, but reliably.

Another object is to accomplish such orientation of delicate sticks which are nonuniform lengthwise, such as asparagus shoots, with little or no damage to them.

An additional object is to provide a method and apparatus for orienting various types of sticks or stick-like articles which are nonuniform lengthwise, such as asparagus shoots, celery stalks, rhubarb stalks, carrots, broccoli stalks and fish, even though the sticks of a particular commodity may differ considerably in length and/or cross section, or be misshapen to a greater or lesser degree.

It has been customary heretofore to orient asparagus shoots by hand so that the tips are all at one end and the butts are all at the other end, which has required a large amount of labor and has not avoided injury to the shoots. The automatic orientation operation of the present process is dependent upon the nonuniformity lengthwise of asparagus shoot sticks. The shoot tapers more or less from its butt to its tip, and the butt is more dense and fibrous than the tip and consequently heavier. Also, the butt portion is harder and stiffer than the tip portion of the shoot. In addition, the butt is blunt and the tip is tapered. These various characteristics may contribute to a greater or lesser extent to the orientation process performed by the apparatus shown in the drawings.

The first step in the operation of the apparatus is to move the asparagus shoots or other stick-like articles to be oriented from a random orientation situation into a relationship in which the shoots are generally parallel. The asparagus shoots will be delivered in random orientation into a supply hopper 1 from which asparagus shoots can be dispensed to successive aligning conveyors or feed tables 2 and 3, which serve both to feed the asparagus shoots lengthwise and to arrange them in generally parallel relationship.

Figures 1, 3:
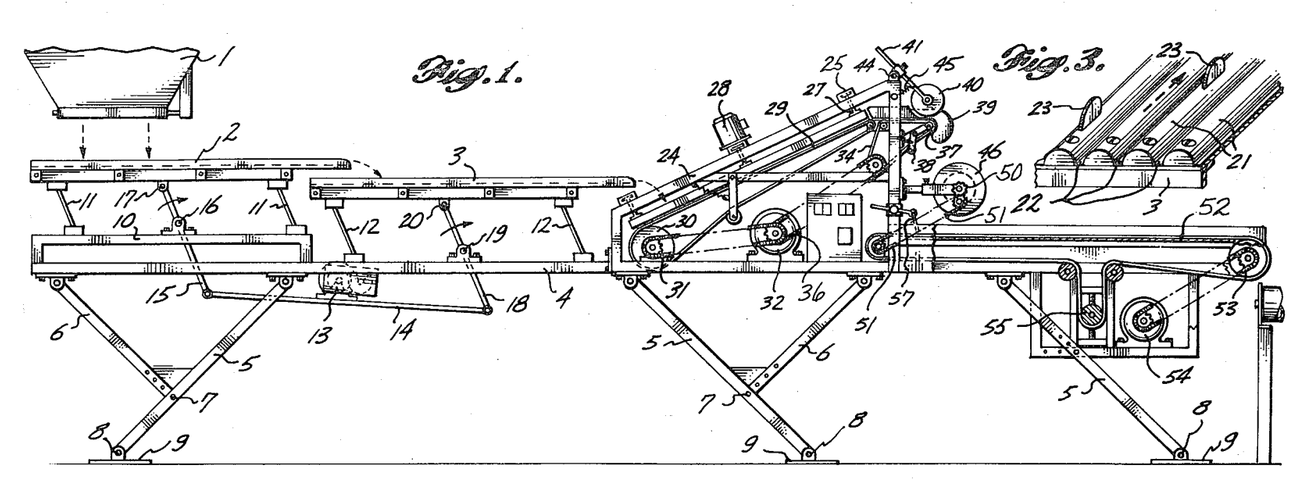
FIG. 1 is a side elevation of stick-orienting apparatus according to the present invention.
FIG. 3 is a detail top perspective on an enlarged scale of a portion of such apparatus.

While aligning conveyor means can be of various types, the successive aligning conveyors 2 and 3 shown in FIG. 1 are of the vibrating type. Such conveyors are mounted on a frame 4, which is supported by legs 5 and braces 6 connected to such legs by pins 7. The lower ends of the legs are mounted by pins 8 on floor plates 9. By such leg arrangement the space beneath the supporting frame 4 is least obstructed to facilitate cleaning of the floor.

The first vibrating conveyor 2 is supported at an elevation somewhat above the second conveyor 3 by an auxiliary frame 10 mounted on the main frame 4. The conveyor table is supported from such auxiliary frame by upright resilient posts 11, which are inclined from the vertical to some extent so that the vibration of the conveyor table will effect feeding of the shoots toward the right, as seen in FIG. 1. Correspondingly, the table of conveyor 3 is supported from the frame 4 by upright resilient posts 12, which are inclined somewhat relative to the vertical.

The two conveyor tables are vibrated by vibrating mechanism which is common to the two conveyors. Such vibration is effected by a motor 13 driving an eccentric weight which is mounted centrally on a platform 14 suspended from the conveyor frame. The lower end of a level 15, pivotally connected to one end of the platform 14, is mounted for oscillation by pivot 16 and is connected to the table of conveyor 2 by another pivot 17. The opposite end of the platform 14 is pivotally connected to the lower end of another lever 18, which is mounted on the frame by a pivot 19. The upper end of this lever is attached to the second conveyor 3 by a pivot 20.

Figure 2:
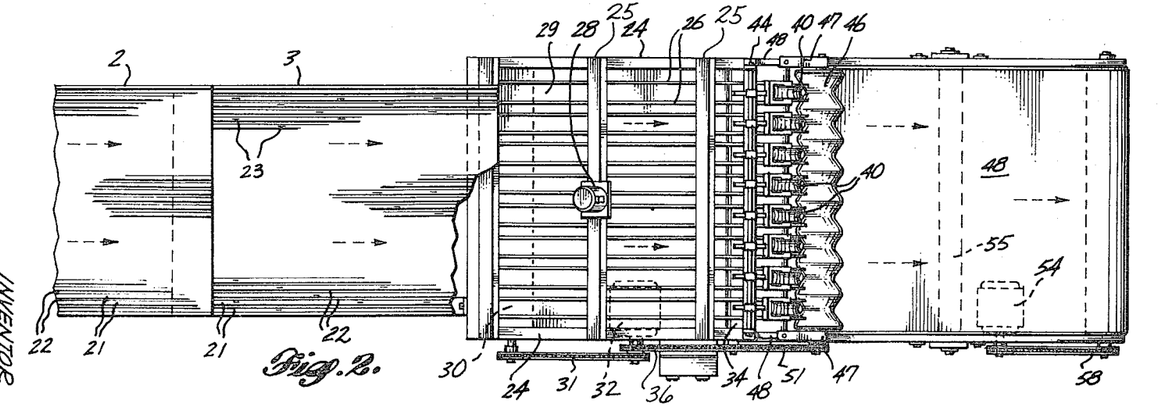
FIG. 2 is a plan of such apparatus.

As the eccentric weight of the vibrator 13 is driven, the tables of conveyors 2 and 3 will be vibrated. Because of the inclination of their supporting posts 11 and 12 such tables will pitch to the right as well as being vibrated, so as to propel the asparagus shoots to the right first along the table of conveyor 2 to be deposited onto the table of conveyor 3, and then along the table of conveyor 3 to be discharged from its right end. As shown best in FIGS. 2 and 3, each of the vibrating conveyor tablets has ridges 21 and intervening grooves 22 extending lengthwise of it. Consequently, as these conveyors are vibrated the shoots will be oriented so that their lengths extend lengthwise of such ridges and grooves.

To effect swinging of any asparagus shoots lying across ridges 21, fins 23 or other projections may be provided at spaced locations along the ridges so as to impede movement of the shoots along at least the table of conveyor 3 transversely of their lengths. Engagement of an asparagus shoot with one of the projections 23 off center will effect swinging of the shoot toward alignment with the ridges 21 and grooves 22 as the vibrating action impels the shoot along the conveyor.

Figure 4:
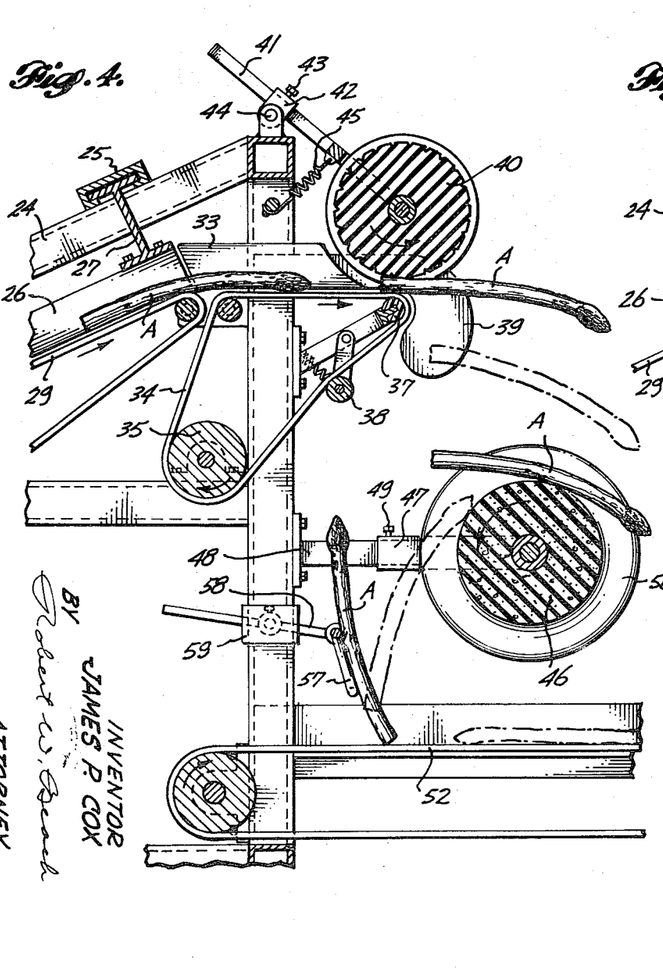
FIG. 4 is a vertical longitudinal section through a portion of the apparatus.
Figure 5:
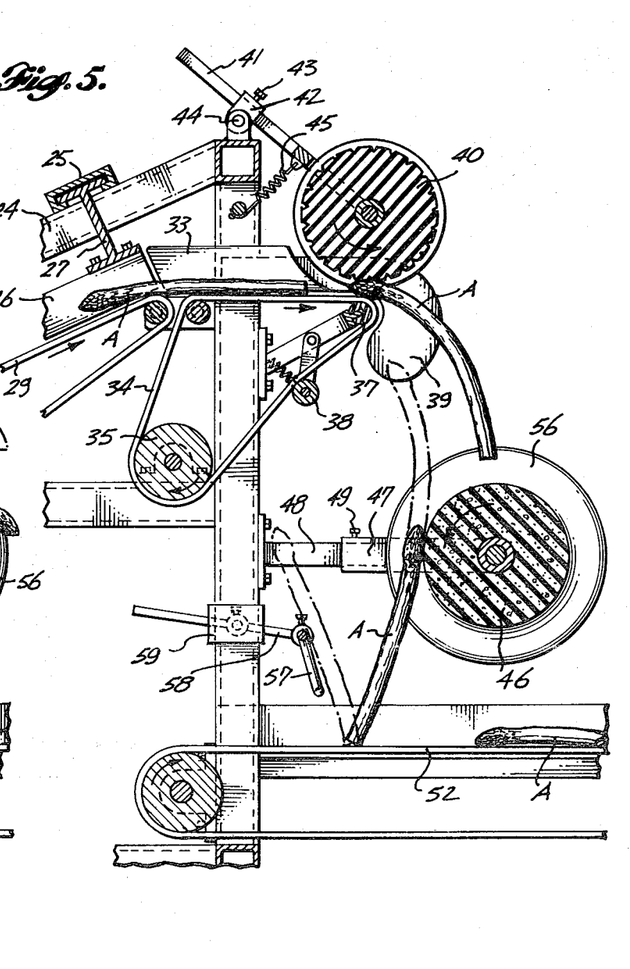
FIG. 5 is a similar view showing sticks in positions different from those shown in FIG. 4.

From the aligning conveyor 3 the asparagus shoots are discharged onto a singling feed conveyor mounted on a frame having upwardly inclined longitudinal side bars 24, connected by crossbars 25. Such crossbars are of channel shape having inwardly directed edge flanges, as shown in FIGS. 4 and 5. Spaced parallel conveyor-divider plates 26 are carried by crossbars 27 of I-beam shape, the upper flanges of which are slidably received in the downwardly opening frame cross channels 25. An eccentric weight vibrating motor 28 is mounted on one of the divider-supporting crossbars 27 to vibrate the divider-plate and crossbar assembly to facilitate movement of the asparagus shoots up the feed conveyor one at a time and to reduce friction between the asparagus shoots and the divider plates.

The individual asparagus shoots are actually moved up the slope of the singling feed conveyor by lying on the upper stretch of an endless conveyor belt 29. The conveyor belt loop extends around spaced pulleys, and the lower pulley 30 is driven by a chain 31 powered by a motor 32. Such inclined conveyor belt transports the asparagus shoots upward to discharge them between stationary conveyor side plates 33 adjacent to the upper end of such conveyor.

Between the stationary side plates 33 of each pair runs the upper stretch of an endless belt 34, which preferably is substantially horizontal. The adjacent portions of the upwardly inclined upper stretch of conveyor belt 29 and the horizontal upper stretch of the conveyor belt 34 are disposed at a dihedral angle to form a hump over which the asparagus shoots are conveyed, as shown in FIGS. 4 and 5. A curved or bent asparagus shoot, disposed with such curve in a horizontal plane while moving up the incline of the upper stretch of belt 29, will roll automatically as it passes over the hump between the two upper conveyor belt stretches, as indicated in FIGS. 4 and 5, so that the curvature will be disposed in an upright plane with the concave side downward.

The upper stretch of the conveyor belt 34 is shorter than the asparagus shoots which it carries. The drive pulley 35 for this conveyor is driven by chain 36, powered by motor 32, at a linear speed somewhat greater than the speed of travel of belt 29, so as to expedite movement of the asparagus shoots away from conveyor belt 29. The end of the upper stretch of conveyor belt 34 remote from conveyor belt 29 passes around a stationary guide shoe 37 and is held close to such shoe by the belt tightener 38 to provide an abrupt effective termination of the upper stretch of the conveyor belt 34. Guide plates 39 at opposite sides of the conveyor belt 34 project beyond the discharge end of such conveyor, and both above and below it.

The lower portion of a resilient hold-down roller 40 is received between the guide plates 39 and is located directly above the discharge end of the conveyor belt 34, as shown in FIGS. 4 and 5, so that the roller and the belt loop end beneath it form cooperating rotative pinching members. This roller is journaled on the end of a supporting arm 41 which is longitudinally slidable in a guide 42 and can be secured in any lengthwise adjusted position in such guide by set screw 43. The guide is mounted on the machine frame by a pivot 44 so that the arm 41 can swing about a horizontal axis to enable the roller 40 to be moved toward and away from the conveyor belt 34. Such hold-down roller may simply be an idler if its periphery is roughened to provide an adequate grip on the asparagus shoot and the tension spring 45 exerts sufficient force to pull the arm 41 for holding the roller against the asparagus shoot so that the roller will be turned in synchronism with the movement of the belt 34. Alternatively, the hold-down roller can be driven positively.

A short distance beyond the discharge end of conveyor 34 and located a substantial distance below it is a barrier member in the form of a roller 46 journaled on arms 47, which are engaged telescopically with supporting arms 48. Such supporting arms may be attached to the machine frame at a selected desired elevation, depending upon the length of asparagus shoots to be porcessed, or such arm can be constructed for adjustment elevationally. The barrier roller can be secured in a desired position outward from conveyor 34 by set screws 49, holding roller mounting arms 47 in fixed relationship to supporting arms 48.

Figures 6, 7, 8, 9, 10, 11:
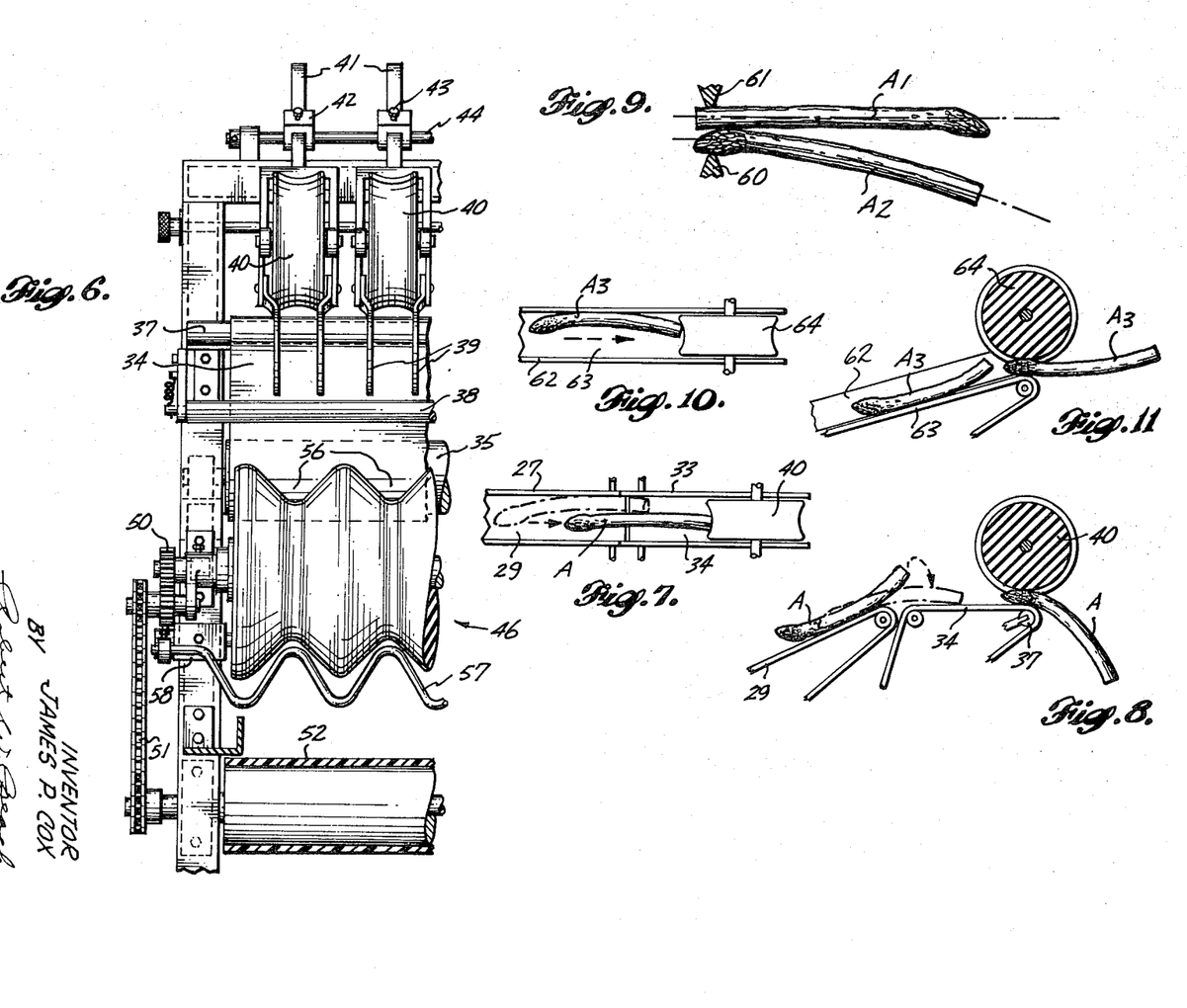
FIG. 6 is a vertical transverse section through a portion of the apparatus, parts being broken away.
FIG. 7 is a detail plan of a portion of the apparatus, shown somewhat diagrammatically.
FIG. 8 is a side elevation of the same portion of the apparatus.
FIG. 9 is a side elevation of apparatus demonstrating a feature of the principle of the process.
FIG. 10 is a plan of a fragmentary portion of apparatus different from that shown in FIGS. 1 to 8, inclusive.
FIG. 11 is a longitudinal vertical section through the portion of the apparatus shown in FIG. 10.

The barrier roller 46 is driven in a direction such that its upper periphery turns toward the conveyor 34, which, as seen in FIGS. 4 and 5, is counterclockwise. Such roller drive is effected by gears 50, shown in FIG. 6, driven by a chain 51 connected to the discharge conveyor 52. Such conveyor is driven by a chain 53 powered by a motor 54. The belt of such conveyor is kept tight by a tightener 55 shown in FIG. 1. The barrier roller 46 has in it one or more grooves 56 as shown in FIGS. 4, 5 and 6, each of which grooves is of a width substantially greater than the thickness of the thickest asparagus shoot to be processed. Consequently, an asparagus shoot which drops into such a groove will be centered in it by the wedging action of the groove's sloping sides.

A rest and guide 57 having indentations corresponding to those of the roller 46 may be provided adjacent to the conveyor 52 at the discharge side of such roller, as shown in FIGS. 4, 5 and 6. Such rest and guide may be in the form of an undulating rod as shown in FIG. 6, having end portions secured in collars on the ends of supporting rods 58. Such rods are slidably received in brackets 59 mounted on the machine frame. Such mounting of the rest and guide will enable it to be raised or lowered to be moved toward or away from barrier roller 46, and to be swung to provide the preferred operation of the rest.

Asparagus shoots deposited in random arrangement onto the vibrating conveyor 2 from the hopper 1 will be propelled along the conveyors 2 and 3 by their vibration and during such movement will become aligned with the conveyor grooves 22. Because of the slope of the upper stretch of conveyor belt 29 and the vibration of the side plates 26, the asparagus shoots will be moved upward by the belt 29 in single file. The belt 34 will accelerate the lengthwise movement of each shoot somewhat into gripping engagement with the hold-down roller 40. The shoot will be gripped between the hold-down roller and the belt so that, despite termination of the conveyor at the shoe 37, the shoot will continue to be moved generally horizontally by the propelling pinching action of the conveyor and hold-down roller substantially to the end of the shoot, instead of the shoot simply overbalancing and falling off the end of the conveyor.

While the conveyors 2 and 3 orient the asparagus shoots to the extent of substantially aligning them with the grooves 22 of the vibrating tables, such tables cannot orient the shoots so that the leading end in each instance will be the tip of the shoot or the leading end will be the butt of the shoot. On the contrary, some shoots will be moved along the conveyors 3 and 29 tip first and others will be moved along such conveyors butt first.

In FIG. 4 an asparagus shoot is shown being fed tip first from the conveyor 34. Despite the fact that only a small portion of an asparagus shoot A clamped by roller 40 is in engagement with the conveyor 34, the movement of the shoot is still under the control of the pinching action effected by the conveyor and hold-down roller. Corresponding control is effected even if the portion of the asparagus shoot pinched between the conveyor 34 and the hold-down roller 40 is the tip of the shoot as shown in FIG. 5. The effect on the shoot will, however, be different in these two instances.

FIG. 9 shows apparatus for demonstrating the principle of the orientation method performed by the apparatus shown in FIGS. 1 to 8, inclusive. In this figure two shoots of asparagus A1 and A2 are illustrated as having their end portions gripped between a lower jaw 60 and an upper jaw 61. The only difference is that the butt of asparagus shoot A1 and the tip of asparagus shoot A2 are gripped by the jaws. Since the tip of an asparagus shoot is weaker, softer and more flexible than the butt of an asparagus shoot, and the butt of an asparagus shoot is larger and heavier than its tip, the shank of an asparagus shoot cannot be held as nearly horizontal by pinching its tip as by pinching its butt. The result is that an asparagus shoot held in cantilever fashion by its tip, as illustrated by shoot A2 in FIG. 9, will sag or droop to a considerably greater extent than an asparagus shoot such as A1, which is held in cantilever fashion by pinching its butt.

Applying this principle to the machine of FIGS. 1 to 8, inclusive, it will be seen in FIG. 4 that the asparagus shoot launched endwise by the conveyor 34 and hold-down roller 40 engaging its butt will be much more nearly horizontal than an asparagus shoot launched by its tip, as shown in FIG. 5. The stiffness of individual shoots varies considerably depending upon their freshness, whether they are frozen or partly thawed, and their cross-sectional sizes.

As shown in FIG. 4, an asparagus shoot launched tip first, by its butt being pinched between the conveyor 34 and roller 40, will fall in a generally horizontal attitude so that its midportion will strike the barrier roller 46. Actually, the location at which the asparagus shoot engages the groove 56 of the roller is closer to its tip than to its butt, and since the butt is also larger and heavier than the tip the butt will swing downward. Moreover, the rotation of the barrier roller 46 will act to swing the butt of the asparagus shoot downward so that it will slide out of the roller groove to fall butt first onto the conveyor 52.

The frictional engagement between the belt of conveyor 52 and the butt of the asparagus shoot will move such butt to the right as seen in FIG. 4, and cause the shoot to swing back against the rest 57. As the conveyor continues to move to the right, the butt will be dragged in that direction until the entire shoot lies prone on the conveyor belt.

If an asparagus shoot is fed butt first from the conveyor 34 between such conveyor and the hold-down roller 40, as shown in FIG. 5, the shoot will droop much more when it is held in cantilever fashion by the head than an asparagus shoot held by the butt, as shown in FIG. 4. Again the amount of droop will depend upon the condition of the asparagus shoot, its stiffness, size and length. In every case, however, as the tapered tip progresses through the pinching device, the ability of the very tip of the head to support the weight of the shoot will decrease rapidly, but not abruptly. Consequently, while the pinching means is still gripping the very tip of the asparagus head, the shank of the asparagus shoot will not only curve downward but will swing downward as indicated in FIG. 5.

When the asparagus shoot is launched butt first, therefore, by gripping the tip, the shank of the shoot will be in a very drooped attitude, even though the tip is launched horizontally. The roller 46 should be adjusted relative to the pinching means, both elevationally and horizontally, so that the butt of the asparagus shoot will engage the downwardly moving portion of the groove 56. Such engagement of the roller will deflect the butt to the left as seen in FIG. 5, so that the shoot falls through the broken-line intermediate position into the solid-line position where the butt has landed on the conveyor belt 52. Movement of such conveyor belt to the right, as seen in FIG. 5, will shift the butt of the shoot to the right while its tip rests against the roller 46 until the shoot tips over into a position lying on the conveyor belt.

In some instances a shoot may be sufficiently limber and/or the tips sufficiently weak and/or pointed so that the shoot will not encounter roller 46 at all, but will drop on the near side of such roller butt first. As the butt encounters the conveyor belt 52, the shoot may tip to the left into the lower broken-line position shown in FIG. 5. Engagement of the butt with the conveyor belt moving to the right will then drag the shank of the shoot down the rest 57 until the shoot lies prone on the conveyor belt.

Thus it will be seen that whether the asparagus shoot is launched abruptly tip first by gripping the butt as illustrated in FIG. 4, or is launched butt first by gripping the tip as shown in FIG. 5, the butt of the asparagus shoot will aways be the lower end when the asparagus shoot reaches the conveyor, and the shoot will be tipped so that the conveyor will carry the shoot butt first. The most delicate part of such an asparagus shoot is the tip, and since in falling the shoot virtually always lands on its butt initially, any damage to the tip would be caused only by the asparagus shoot falling over and by the pressure of the pinching means on the tip when the asparagus shoot is launched butt first. Injury to the asparagus shoot will therefore be minimized.

The reliability of orientation effected by the machine is not reduced appreciably if some of the asparagus shoots are curved to a greater or lesser degree as is often the case. If a curved shoot were fed to the pinching means by a linear conveyor including sides 62 and a flat belt 63, as shown in FIGS. 10 and 11, it would be possible for such a shoot A3 to lie against the conveyor side with its concave side up. The attitude of such a shoot might not be altered as it passes between the belt 63 and the hold-down roller 64.

In such case the asparagus shoot might actually curve upward from horizontal even when the pinching means begin to engage the asparagus head, as shown in FIG. 11. The shoot might not swing downward sufficiently as it is projected so that the butt end of the shoot would engage the near downwardly moving side of the groove 56 in barrier roller 46. If such a shoot slid over the far side of the roller it might slide far enough so that when the shoot was finally lying prone on the conveyor 52 its butt end would lead. Occasionally, however, such a shoot might swing around the barrier roller so that its tip fell forward onto the conveyor 52 causing a misorientation.

To avoid such a possibility the conveyors 29 and 34 are arranged to provide a hump at their transition location, as shown somewhat diagrammatically in FIGS. 7 and 8. With this type of conveyor construction even if an asparagus shoot were carried upward by conveyor 29 with its concave side upward, the shoot would roll by gravity from the solid-line position of FIG. 8 to the broken-line position with its concave side downward as it passes over the hump between these two conveyors formed by the dihedral angle between them.

The asparagus shoot would maintain this concave side downward position as it is carried along by belt 34 until the leading end of the shoot is pinched between such conveyor and the hold-down roller 4. The holding action of such pinching means prevents the shoot from rolling back into a position in which the shoot is in a horizontal plane. As the shoot progresses through the pinching means formed by belt 34 and hold-down roller 40, the curved shoot will droop farther than a straight shoot would droop, but it will not droop beyond a substantially vertical position even at the moment of launching. Consequently again the shoot will drop butt first onto the discharge conveyor belt 52.

If another type of stick which is nonuniform lengthwise were processed for orientation by the present method and generally comparable apparatus, such stick would still be launched by pinching means pinching the stick end. The attitude of the stick at the instant of launching would depend to a considerable extent on the physical structure of the launching end as well as the weight distribution throughout the length of the stick. A barrier roller or other barrier member could then be arranged to swing the stick in one direction or the other as might be necessary to complete the orientation of part or all of the falling sticks.

To reduce further the possibility of damage to a delicate stick the barrier roller 46 could be made of or covered with sponge plastic or rubber and the discharge belt 52 could be made of or covered with sponge plastic or rubber. Also the hold-down roller 40 can be made of material which is sufficiently firm to effect the pinching required to accomplish the launching of the stick, but should be no firmer than required for this purpose. The type of material used could, of course, be selected so as to be as compatible as possible with the type of stick material being oriented.

Figure 12:
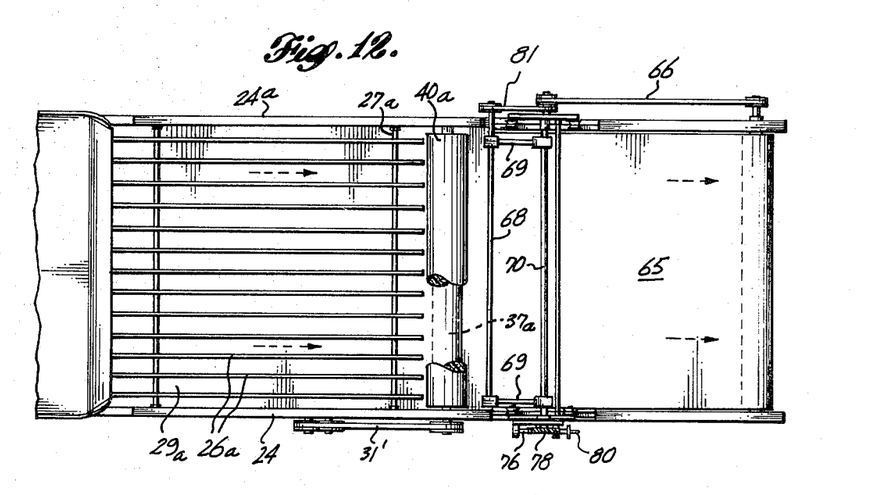
FIG. 12 is a plan of an alternate form of machine embodying the invention.
Figure 13:
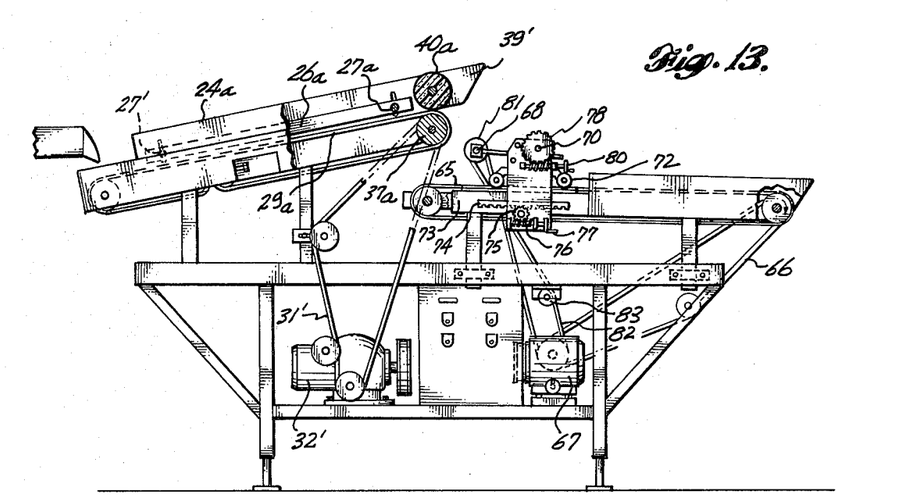
FIG. 13 is a side elevation of such machine.
Figure 14:
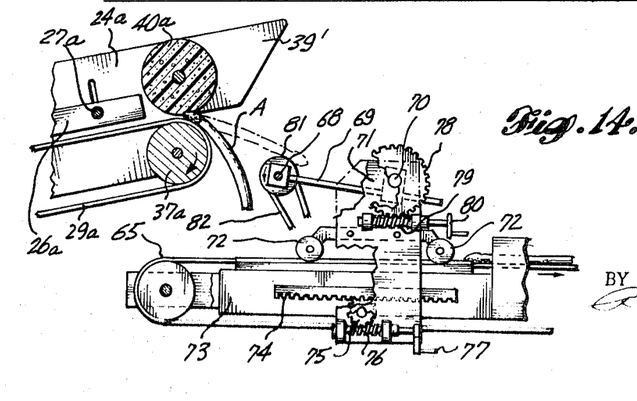
FIG. 14 is a side elevation of a fragmentary portion of such machine on an enlarged scale.

Mechanism somewhat simpler than that shown in FIGS. 1 to 6, inclusive, may be used, particularly if the sticks to be oriented are not bent appreciably. In the mechanism of FIGS. 12, 13 and 14 the feed conveyor belt 29a is driven by a belt 31' which is powered by a motor-driven speed-reducer 32'. In this instance, instead of having a separate stick-launching belt 34, the belt 29a extending around the roller 27' constitutes the stick-launching belt. The spaced parallel conveyor-dividing plates 26a are carried by cross rods 27a and such rods and dividers are not vibrated. The guide plates 39' simply constitute forward extensions of the conveyor side plates 24a. The hold-down roller 40a extends unbroken over the full width of the conveyor belt 29a instead of each hold-down roller being of a width approximately equal to the spacing between adjacent divider plates. The roller 40a either can be of the idler type, or can be driven positively in synchronism with the underlying roller 37a.

Stick members launched from between the rollers 37a and 40a are deposited on a conveyor belt 65 driven by a belt or chain 66, which is powered by a motor 67. Between the stick-launching rollers 37a and 40a and the receiving belt 65 is mounted a barrier member which, in this instance, is a rod 68 disposed with its length extending transversely of the direction in which the stick members are launched by the rollers 37a and 40a, and preferably is parallel to the axes of such rollers. Such barrier rod is located beyond the launching rollers in the direction of stick movement and a greater or lesser distance below such launching rollers.

While the location of the barrier rod 68 could be established definitely in the design of the machine depending upon its use, it is preferred that such rod be mounted for adjustment both horizontally toward and away from the launching rollers, and elevationally with respect to such rollers. The rod is shown as being supported by two arms 69 spaced lengthwise of the rod, which arms project from a shaft 70 toward the launching rollers. The opposite ends of such shaft are mounted in end plates 71 of a carriage which is supported by wheels 72 for rolling along stationary tracks 73.

On one of such tracks is mounted a rack 74, the length of which extends parallel to the track length and is engaged by a gear 75 turned by a worm 76 by rotation of a handle 77. Such handle rotation in one direction or the other will move the carriage carrying shaft 70 to shift the barrier rod 68 closer to or farther from the launching rollers 37' and 40'. The elevation of the barrier rod can be adjusted by rotating a gear 78 secured on shaft 70 by rotation of worm 79 effected by turning crank handle 80. Turning of such handle in one direction will raise the barrier rod and turning of the handle in the opposite direction will lower such rod.

The barrier rod 68 may be mounted fixedly on arms 69 or such rod may be rotatable in bearings mounted on those arms. If the rod is rotatable, it can be turned in a direction such that its upper side moves toward the launching rollers by rotation of a pulley 81 secured on the rod. This pulley is driven by a belt 82 from motor 67 and such belt can be kept taut in various adjusted positions of the rod 68 by a belt-tightener 83.

The operation of the stick-orienting machine shown in FIGS. 12, 13 and 14 is generally the same as that of the machine shown in FIGS. 1 to 6. The position of the barrier rod 81 should be adjusted so that asparagus shoots, for example, launched by the rollers 37a and 40a tip first will be projected so that, as the asparagus shoot falls, a portion of it between its center of gravity and its tip will strike the barrier rod to enable the butt to swing downward and land on conveyor 65. If the asparagus shoot is launched butt first, the shoot is sufficiently limber so that its butt end will droop below the barrier rod 68 before it reaches such rod, as illustrated in FIG. 14. When the asparagus shoot is launched by its tip, therefore, it will fall so that again the butt of the shoot will drop onto conveyor belt 65.

Figure 15:
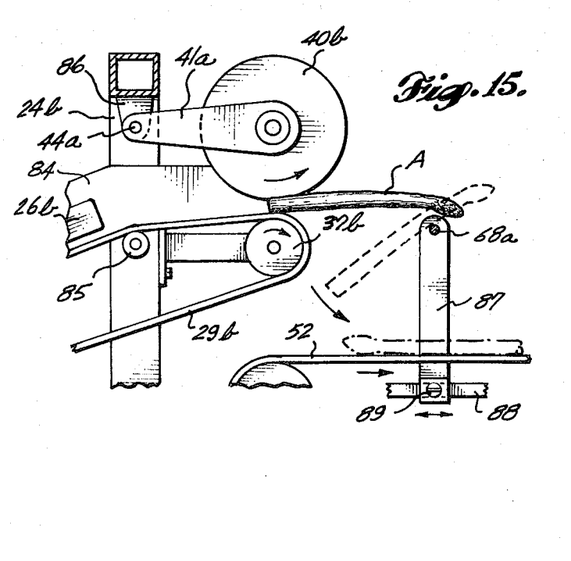
FIGS. 15 and 16 are somewhat diagrammatic side elevations of a portion of a further modified machine illustrating different types of operation.
Figure 16:
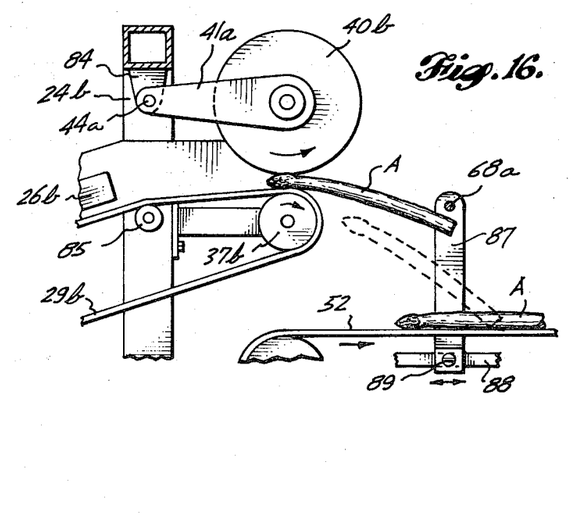

The machine fragment shown in FIGS. 15 and 16 is generally the same as the corresponding portion of the machine shown in FIGS. 12, 13 and 14, except that in this instance a hump is formed in the feed conveyor belt 29b by such belt passing between sidewalls 84 over a roller 85 located to dispose the stretches of the belt at opposite sides of such deflecting roller at a dihedral angle. The purpose of providing such a hump in the belt is to cause bent stick articles to roll to dispose their concave sides downward as illustrated particularly in FIG. 8.

Also, in the machine of FIGS. 15 and 16, instead of the hold-down roller rotating on a fixed axis so that shoots of different thickness merely compress the material of the roller to a greater or less extent, the hold-down roller 40b of FIGS. 15 and 16 is carried by an axle mounted in the swinging ends of arms 41a supported on the machine frame 24b by pivots 44a carried by lugs 86. When a comparatively slim shoot of asparagus A is being launched between the rollers 37b and 40b, the hold-down roller will be raised by upward swinging of arms 41a a smaller amount than when a thicker shoot of asparagus is being launched. By mounting the hold-down roller 40b so that it can be raised different amounts by bearing on stick members of different thickness, the material of which the roller is made can be firmer than would otherwise be desirable.

At the discharge side of the rollers 37b and 40b, the barrier rod 68a is supported by uprights 87 that can be adjusted toward and away from the stick-launching rollers along generally horizontal rods 88. The uprights can be fixed to such rods in desired positions by setscrews 89. The desired location of the barrier will depend upon the length of the asparagus shoots or other articles A being oriented. The shorter such articles are, the closer barrier 68a should be to the launching rollers, and the longer such articles are, the farther such barrier rod should be away from the launching rollers.

In FIG. 15, an asparagus shoot A is shown as being launched tip first, and in FIG. 16 such an asparagus shoot is shown as being launched butt first. The butt end of such an asparagus shoot is more rigid than the tip of such shoot and, consequently, the launching rollers will project the shoot A tip first sufficiently horizontally so that the tip of the shoot passes over the top of the barrier rod as shown in FIG. 15. When the butt of the shoot has been discharged from between the rollers 37b and 40b during launching, the shoot will begin to fall so that the tip portion will engage the barrier rod while the butt swings downward around the barrier rod as the center as shown in broken lines in FIG. 15. Consequently, the shoot will drop butt first onto the discharge belt 52, movement of which will carry the butt forward as movement of the tip is deterred by engagement with the barrier rod 68a, so that the shoot will fall onto the discharge belt lengthwise of it and butt first.

When an asparagus shoot A is launched butt first by the rollers 37b and 40b, however, as shown in FIG. 16, the more limber tip portion of the shoot cannot support the butt portion of the shoot in a position elevated as much as the tip shown in FIG. 15. Consequently, the butt will droop below the barrier rod 68a, as shown in FIG. 16, so that when the asparagus shoot is launched butt first by the rollers 37b and 40b the shoot will fall in an inclined position with its butt lower, as shown in broken lines in FIG. 16. When this shoot has fallen into the lower solid line position shown in FIG. 16 where it is supported entirely by the belt 52, such asparagus shoot also will be carried by the belt butt first. Whether an asparagus shoot is launched by the rollers 37b and 40b tip first, as shown in FIG. 15, or butt first, as shown in FIG. 16, therefore, it finally will be removed from the orienting mechanism butt first by the discharge belt 52.

It is possible to use an automatic elevationally adjustable positioning of the hold-down roller to shift automatically the position of the barrier rod in a desired manner. To accomplish this purpose, the construction shown in FIGS. 17, 18 and 19 can be used. Longitudinally spaced portions of the barrier rod 68b are mounted in slides 90 movable lengthwise of supporting rods 91 toward and away from the hold-down roller and securable in an adjusted position by setscrews. The elevation of the barrier rod 68b relative to the hold-down roller 40c can be adjusted easily because the supporting rods 91 are carried by collars 92 encircling shaft 93. Such collars can be secured in desired angularly adjusted positions by setscrews 94.

Figure 17:
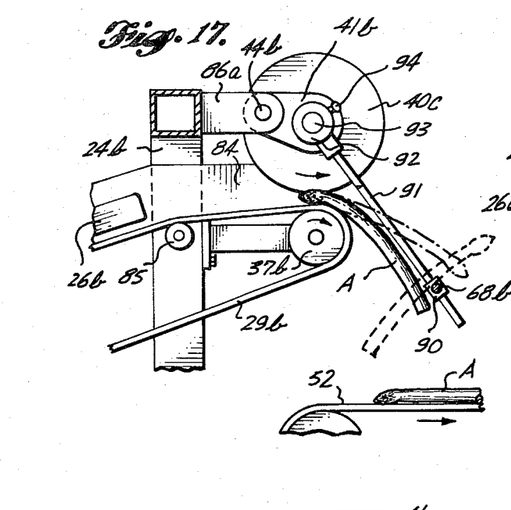
FIGS. 17, 18 and 19 are somewhat diagrammatic side elevations of a portion of a still further modified machine illustrating different types of operation.
Figure 18:
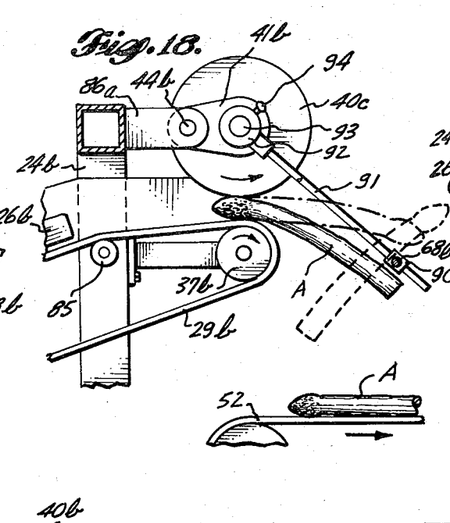
Figure 19:
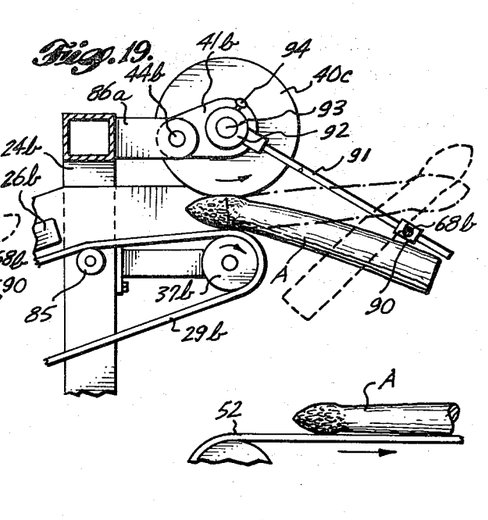

The portions of shaft 93 at opposite sides of the hold-down roller 40c are carried by the swinging end portions of arms 41b. Such arms are mounted by pivots 44b on lugs or arms 86a carried by frame 24b. The hold-down roller 40c rotates on shaft 93 as an axle, but such shaft is fixed against rotation with respect to the swingable arms 41b. Such arms, the barrier rod 90 and its supporting arms 91 can therefore swing up and down as a unit about the axis of horizontal pivots 44b.

It will be evident from FIGS. 17 to 19 that, as the hold-down roller 40c is raised by movement of a stick member between the belt 29b and the hold-down roller 40c, the arms 41b and, consequently, the barrier rod 68', will be raised. The barrier rod will be raised to a greater extent than the hold-down roller, but its raising will be in proportion to raising of such hold-down roller in the ratio of the distances between the axle 93 and pivot 44b, on the one hand, and the barrier rod 68b and pivot 44b on the other hand.

In FIGS. 17, 18 and 19, different sizes of asparagus shoots are shown being launched, the most slender shoots being shown in FIG. 17, shoots of medium size being shown in FIG. 18 and the thickest or jumbo shoots being shown in FIG. 19. A slender shoot passing between the feed roller 37b and the hold-down roller 40c will, of course, elevate such hold-down roller and the barrier rod 68b to the smallest extent, as shown in FIG. 17. Because such a slender shoot is very limber and its tip portion is the most limber, it will droop very decidedly in being launched, such as into the solid-line position shown in FIG. 17. Such droop would be so pronounced that, as shown, the butt end of the shoot will not be projected over the barrier rod 68b. Consequently, when such an asparagus shoot is launched butt first, it will fall butt first onto the discharge conveyor 52 and be removed butt first in position lying on the conveyor belt.

If the same type of asparagus shoot is launched tip first, the hold-down roller 40b will be raised the same distance with respect to the feed roller 37b. The butt portion of the asparagus shoot is sufficiently more rigid than the tip portion, however, so that the tip portion will pass over the barrier rod 68b, as shown in the upper broken-line position in FIG. 17. When such shoot is launched by the rollers, its tip portion will strike the barrier rod 68b as the shoot is falling so that the butt portion of the shoot will swing downward into the lower broken-line position shown in FIG. 17, and again be the first portion of the shoot to engage the belt 52. On such engagement, the belt will carry the butt of the asparagus shoot forward so that, again, the shoot will fall onto the discharge belt butt first for removal.

In FIG. 18, an asparagus shoot A of medium thickness is shown as being engaged between the feed roller 37b and the hold-down roller 40c. In this instance, the barrier rod 68b has been elevated to a location considerably higher than the elevation of the barrier rod in FIG. 17. The thicker asparagus shoot of FIG. 18 is much less limber than the slender shoot shown in FIG. 17. Consequently, even though the medium thickness shoot of FIG. 18 is shown in full lines as being launched butt first, it does not droop any more than the slender shoot of FIG. 17 when launched tip first. Consequently, if the barrier rod 68b were in the same position in FIG. 18 as shown in FIG. 17, the asparagus shoot of medium size launched butt first would pass over the barrier rod.

Because the elevation of the barrier rod 68b is altered automatically in accordance with the movement of hold-down roller 40c caused by the shoot passing between the feed roller 37b and such hold-down roller, the barrier rod will be raised sufficiently so that an asparagus shoot of medium thickness launched butt first will droop beneath the barrier rod, as shown in FIG. 18. An asparagus shoot of medium thickness launched tip first, however, as shown in the upper broken-line representation of FIG. 18, is sufficiently stiff so that its tip portion will be projected above the barrier rod in such elevated position. When such asparagus shoot is launched tip first, therefore, its tip portion will strike the barrier rod as the shoot falls after launching so that the butt will swing downward to be the first part of the shoot to engage the discharge conveyor 52. Such engagement with the conveyor will tip the asparagus shoot so that it will fall onto the conveyor with its length lengthwise of the conveyor and oriented butt first.

An asparagus shoot of maximum thickness or jumbo size passes between the feed roller 37b and the hold-down roller 40c, as shown in FIG. 19, the elevation of the hold-down roller relative to the feed roller will swing the barrier rod 68b upward still farther, such as to the position indicated in FIG. 19. Although a jumbo shoot A is much stiffer than even a shoot of medium thickness, such as shown in FIG. 18, such jumbo shoot will droop enough so that its butt portion will pass under the farther elevated rod 68b. If such an asparagus shoot is launched tip first, however, its tip portion will droop very slightly, and, actually, the asparagus shoot may be inclined upwardly as shown in the upper broken-line position of FIG. 19. Under these circumstances, the tip will be projected above the farther elevated barrier rod 68b so that, when the shoot falls after launching, its tip portion again will strike the barrier rod making its butt portion swing downward through the lower broken-line position of FIG. 19 resulting in its butt end being the first portion to engage the discharge belt 52. Whether the jumbo shoot is launched butt first or tip first, therefore, it will be oriented in a butt-first position when lying on discharge belt 52.

Figure 20:
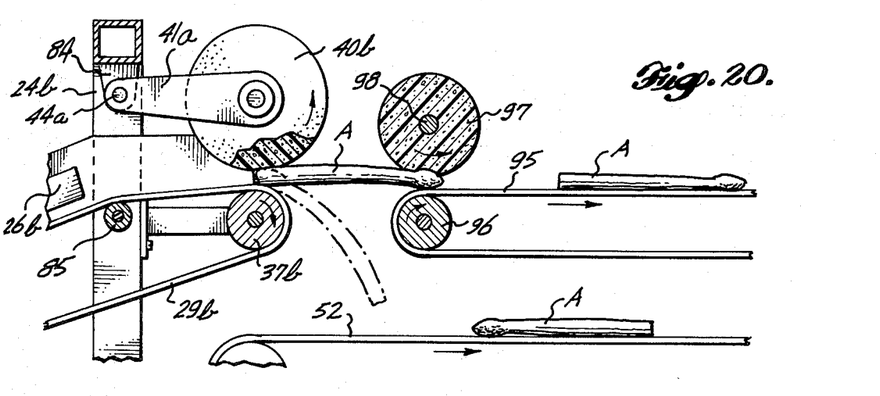
FIGS. 20 and 21 are somewhat diagrammatic side elevations of a combined length-segregating and orienting machine.
Figure 21:
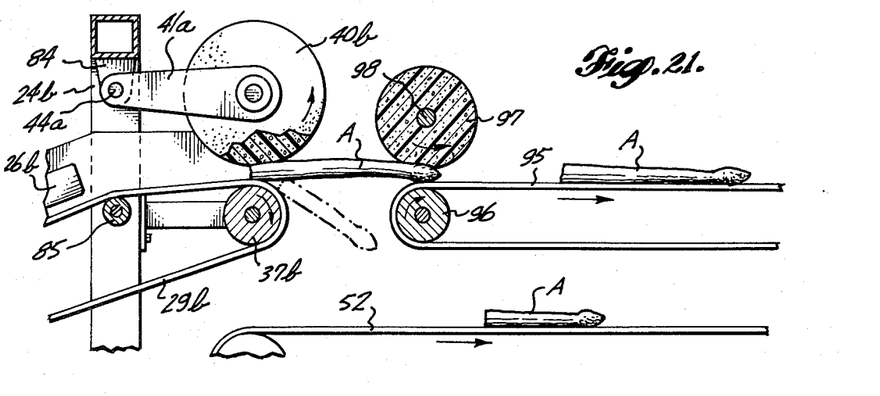

The mechanism shown in FIGS. 20 and 21 is more selective than the mechanism described above in that asparagus shoots are classified not only in uniformly oriented condition, but also such oriented shoots are of a length greater than a predetermined minimum length. In this instance the barrier rod is replaced by discharge mechanism including a looped belt 95 extending around a supporting pulley or roller 96 which cooperates with a hold-down roller 97 mounted on a shaft 98. The belt 95 is driven so that its upper stretch moves away from the feed roller 37b and the hold-down roller 40b constituting the launcher. The space between the upper stretch of belt 95 and the lower portion of the periphery of hold-down roller 97 is approximately on the same level as the launching opening between feed roller 37b and hold-down roller 40b. A second discharge belt 52 is located below the selective discharge belt 95 in the same general position as shown in FIGS. 15 to 19.

When an asparagus shoot A is launched tip first by feed roller 37b and hold-down roller 40b in the manner shown in FIGS. 20 and 21, and it is of sufficient length, the butt portion of the sheet will be supported by the roller 37b and 40b so as to insert the tip of the shoot into the gap between the discharge belt 95 and the hold-down roller 97. Although it is preferred that the hold-down roller 97 be quite soft, such discharge belt and hold-down roller will grasp the tip portion of the shoot sufficiently firmly to pull the shoot onto the upper stretch of discharge belt 95 after the butt portion of the shoot has been released from between the feed roller 37b and the hold-down roller 40b.

If an asparagus shoot of the same length as shown in full lines in FIGS. 20 and 21 were launched butt first by the feed roller 37b and the hold-down roller 40b, the shoot would not maintain a generally straight horizontal condition, but would droop generally in the manner shown in broken lines in FIG. 20 because of the more limber character of the tip portion of the shoot. Consequently, instead of the butt end of the shoot being inserted in the space between the belt 95 and the hold-down roller 97, it would be deflected downward so that when the shoot is launched by the feed roller 37b and the hold-down roller 40b it will fall so that its butt will engage the discharge belt 52 and the shoot will fall onto such belt and be carried away by it butt first.

If a shoot too short to bridge between the launching rollers 37b, 40b and the discharge means including belt 95 and hold-down roller 97 is launched by the rollers 37b and 40b as shown in broken lines in FIG. 21, the shoot will simply fall through the gap between the launching means and the upper discharge means onto the lower discharge belt 52 by which the shoot will be removed tip first. Consequently, the lower discharge belt 52 will remove shoots shorter than a predetermined length, whether launched tip first or butt first, and shoots longer than such predetermined length which are launched butt first. The upper discharge conveyor 95, therefore, will remove only shoots of a length greater than such a predetermined length which are launched tip first.

Figure 22:
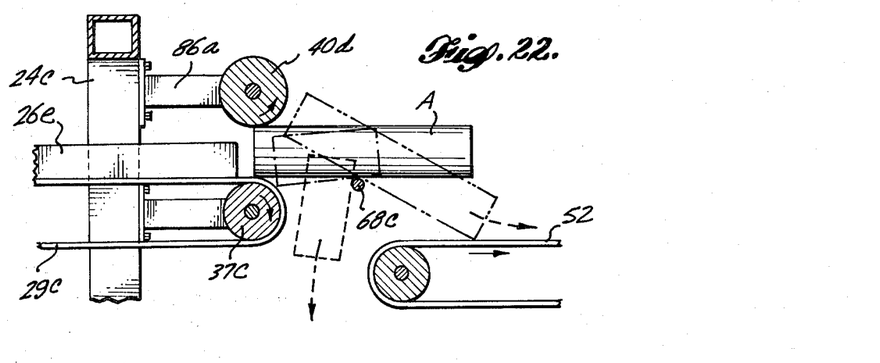
FIG. 22 is a somewhat diagrammatic side elevation of a length-segregating machine.

The articles being processed in FIG. 22 are all of substantially the same thickness but of different lengths. Such apparatus will function to separate articles longer than a predetermined length from articles shorter than such length. The predetermined length to constitute the division point can be selected by adjusting the spacing between the barrier rod 68c and the launching rollers 37c, 40d.

If an article longer than the predetermined length is launched by these rollers, the center of gravity will at least substantially have reached the barrier rod 68c so that the momentum of the article plus the action of the force of gravity on the portion of the article beyond the barrier rod will swing the portion of the article at the side of barrier rod 68c remote from the launching means downward so that the leading end of the article will drop into engagement with the discharge belt 52, as shown in the upper broken-line position of FIG. 22. If, on the other hand, the momentum of the article is not sufficient to carry the center of gravity of the article to and beyond the barrier rod 68c because the length of the article is less than the predetermined length, the force of gravity acting on the portion of the article between the launching means and the barrier rod will cause the trailing end of the article to swing downward as indicated by the left broken-line illustration of FIG. 2. Consequently, the short article will fall between the launching means and the discharge conveyor 52.

While the barrier rod 68c has been stated above to be adjustable to vary the spacing between it and the launching means, it may be desirable to support the discharge conveyor 52 so that it also can be shifted farther from or closer to the launching means to a position to cooperate properly with the barrier rod 68c in its adjusted position.

I claim:

1. The method of controlling movement of a curved stick, which comprises conveying lengthwise a stick having a much greater length in the direction of such conveying than width transversely of the direction of such conveying and which stick is curved lengthwise, and during such conveying rolling the stick so that its concave side is its lower side.

2. The method defined in claim 1, including conveying the stick endwise over a hump so that the stick is automatically rolled by the force of gravity to dispose its concave side downward as it moves over the hump, and gripping the leading end portion of the stick after it has thus rolled.

3. Mechanism for handling sticks curved lengthwise, comprising moving means for moving endwise a lengthwise curved stick of generally circular cross section, rolling means for rolling the curved stick to a position with its concave side downward during endwise movement thereof by said moving means, gripping means for gripping the leading end portion of the stick after it has been rolled by said rolling means to a position with its concave side downward and for releasing the stick during its endwise movement and thus launching it to fall, and control means beyond said gripping means in the direction of endwise stick movement engageable by the stick as it is falling to control the stick to land generally in a predetermined endwise orientation.

4. The method of orienting sticks which comprises moving endwise generally horizontally a limber stick having a much greater length in the direction of such movement than width transversely of the direction of such movement and having unlike end portions, by gripping the trailing end portion of such stick with a portion of such stick ahead of such gripped portion being unsupported and bent downward relative to such gripped portion by the weight of such unsupported portion, and then releasing the stick in such bent condition and thus launching it to fall and in such launching and falling controlling the stick to land generally in a predetermined endwise orientation.

5. The method of orienting sticks which comprises moving endwise generally horizontally a limber stick of generally circular cross section having a much greater length in the direction of such movement than its maximum diameter and having unlike end portions, by gripping the trailing end portion of such stick with a portion of such stick ahead of such gripped portion being unsupported and bent downward relative to such gripped portion by the weight of such unsupported portion, and then releasing the stick in such bent condition and thus launching it to fall and in such launching and falling controlling the stick to land generally in a predetermined endwise orientation.

6. The method of orienting sticks which comprises moving endwise generally horizontally in succession a plurality of sticks each having a much greater length in the direction of such movement than width transversely of the direction of such movement and each stick having a tip portion and a butt portion, the tip portion being more limber than the butt portion, launching the successive sticks, some butt first and some tip first, by gripping their trailing end portions so that, upon launching, the weight of the butt portion of each stick launched butt first will bend downward the portion of the stick adjacent to the gripped tip portion of the stick to a greater extent than the weight of the tip portion will bend downward the portion of the stick adjacent to the gripped butt portion of each stick launched tip first, and engaging the tip portions of the sticks launched tip first so that, during falling, substantially all of the sticks thus launched will land butt first to dispose substantially all of the sticks in the same lengthwise orientation disposed butt first.

7. The method of classifying sticks which comprises moving endwise generally horizontally a plurality of sticks having a much greater length in the direction of such movement than width transversely of the direction of such movement, gripping the trailing portion of each stick and launching the stick from such gripping, in connection with such launching, gripping selectively the leading portions of only those sticks exceeding a predetermined length before the gripping of the trailing portions of such sticks is released, and segregating such sticks having their leading portions gripped to classify such plurality of sticks according to their lengths.

8. The method of orienting sticks which comprises moving endwise generally horizontally in succession a plurality of sticks each of which sticks has a much greater length in the direction of such movement than width transversely of the direction of such movement and a tip portion and a butt portion, the upper side and the lower side of each such portion being substantially alike in shape and the tip portion being more limber than the butt portion, and launching such sticks successively by gripping the trailing end portion of each stick and then releasing the stick to fall and in such launching and falling controlling the sticks so that substantially all of such sticks land generally in a predetermined endwise orientation irrespective of their initial endwise orientation, the weght of the butt portion of each stick launched butt first bending downward the portion of the stick adjacent to the gripped portion of the stick so that at the time of launching the butt portion is lower than the tip portion.

9. The method defined in claim 8, in which each stick is curved lengthwise, and gripping each stick while launching it to dispose the stick with its concave side downward.

10. The method defined in claim 9, including turning the stick into position with its concave side downward before gripping it for launching.

11. The method of classifying sticks which comprises moving endwise generally horizontally a plurality of sticks each of which has a much greater length in the direction of such movement than width transversely of the direction of such movement and is curved lengthwise, and, while continuing to move such stick endwise, gripping the stick to maintain such stick with its concave side downward during continued endwise movement.

12. Mechanism for classifying sticks comprising gripping means for gripping a stick, moving means for moving the stick endwise out of engagement with said gripping means to release the stick, and pinching delivery means spaced from said gripping means and said moving means in the direction in which said moving means moves the stick for gripping the leading portion of the stick prior to release of the trailing portion of such stick from said gripping means, for pulling the stick in substantially the same direction as it had been moved by said moving means.

13. Mechanism for classifying sticks comprising moving means for moving endwise generally horizontally a stick having a much greater length in the direction of such movement than width transversely of the direction of such movement, gripping means for gripping the trailing portion of the stick, said moving means being operable to move the stick out of engagement with said gripping means and to launch the stick, conveyor means below the gripping means for receiving a stick launched by said moving means, and a rest above and adjacent to said conveyor means for engagement by a stick having its lower end engaging and carried by said conveyor means.

14. Mechanism for classifying sticks comprising moving means for moving endwise generally horizontally a stick having a much greater length in the direction of such movement than width transversely of the direction of such movement and which stick is curved lengthwise, gripping means for gripping the leading portion of such a stick moved by said moving means, and rolling means for rolling the curved stick to a position with its concave side downward, said rolling means being located sufficiently close to said gripping means so that a leading portion of the stick is gripped by said gripping means while the trailing portion of the stick is still engaged with said rolling means.

15. Mechanism for classifying sticks comprising moving means for moving endwise generally horizontally a stick having a much greater length in the direction of such movement than width transversely of the direction of such movement, gripping means for gripping the stick, said moving means being operable to move the stick endwise out of engagement with said gripping means, and feed conveyor means for feeding a stick endwise to said gripping means including a conveyor belt, side plates disposed along opposite sides of said conveyor belt and vibrating means for said side plates.

References Cited

UNITED STATES PATENTS

| | | | |
|---|---|---|---|
| 1,658,428 | 2/1928 | Charles | 193—43 B X |
| 2,381,819 | 5/1968 | Crawford | 209—73 |
| 3,467,253 | 9/1969 | Rossi | 209—73 |

RICHARD A. SCHACHER, Primary Examiner

G. A. CHURCH, Assistant Examiner

U.S. Cl. X.R.

209—115; 198—33 AD

PO-1050
(5/69)

UNITED STATES PATENT OFFICE
CERTIFICATE OF CORRECTION

Patent No. 3,702,655               Dated November 14, 1972

Inventor(s) James P. Cox

It is certified that error appears in the above-identified patent and that said Letters Patent are hereby corrected as shown below:

Column 1, line 3, cancel "290 N. Howard,"; line 4, after "Canada" insert --, assignor to Martin, Robertson & Bain Ltd., Vancouver, British Columbia, Canada, a corporation of the Dominion of Canada--.

Signed and sealed this 1st day of May 1973.

(SEAL)
Attest:

EDWARD M. FLETCHER, JR.
Attesting Officer

ROBERT GOTTSCHALK
Commissioner of Patents